United States Patent Office 2,960,841
Patented Nov. 22, 1960

2,960,841
ABSORPTION REFRIGERATION DEFROSTING ARRANGEMENT

Wilhelm Georg Kogel, Stockholm, Sweden, assignor to Aktiebolaget Electrolux, Stockholm, Sweden, a corporation of Sweden Filed Feb. 24, 1959, Ser. No. 795,152

Claims priority, application Sweden Feb. 22, 1958

15 Claims. (Cl. 62—101)

My invention relates to absorption refrigeration systems in which refrigerant evaporates in the presence of an inert gas in a cooling unit subject to formation of frost, and more particularly to the melting of the frost formed during operation of systems of this type.

It is an object of the invention to provide an improvement in refrigeration systems of this type for controlling flow of expelled vapor at an elevated temperature in thermal exchange relation with a cooling unit to melt accumulated frost. I accomplish this by flowing expelled vapor from a place of vapor expulsion to the cooling unit in a path of flow having a liquid trap which is filled with absorption liquid weak in refrigerant during normal operation of the refrigeration system, and by effecting removal of liquid from the trap to open such path of flow responsive to transfer of absorption liquid from the weak absorption liquid line to the rich absorption liquid line of the absorption liquid circuit.

The above and other objects and advantages of the invention will become apparent as the following description proceeds, and the features of novelty which characterize my invention will be pointed out with particularity in the claims annexed to and forming a part of this specification.

Figure 1:
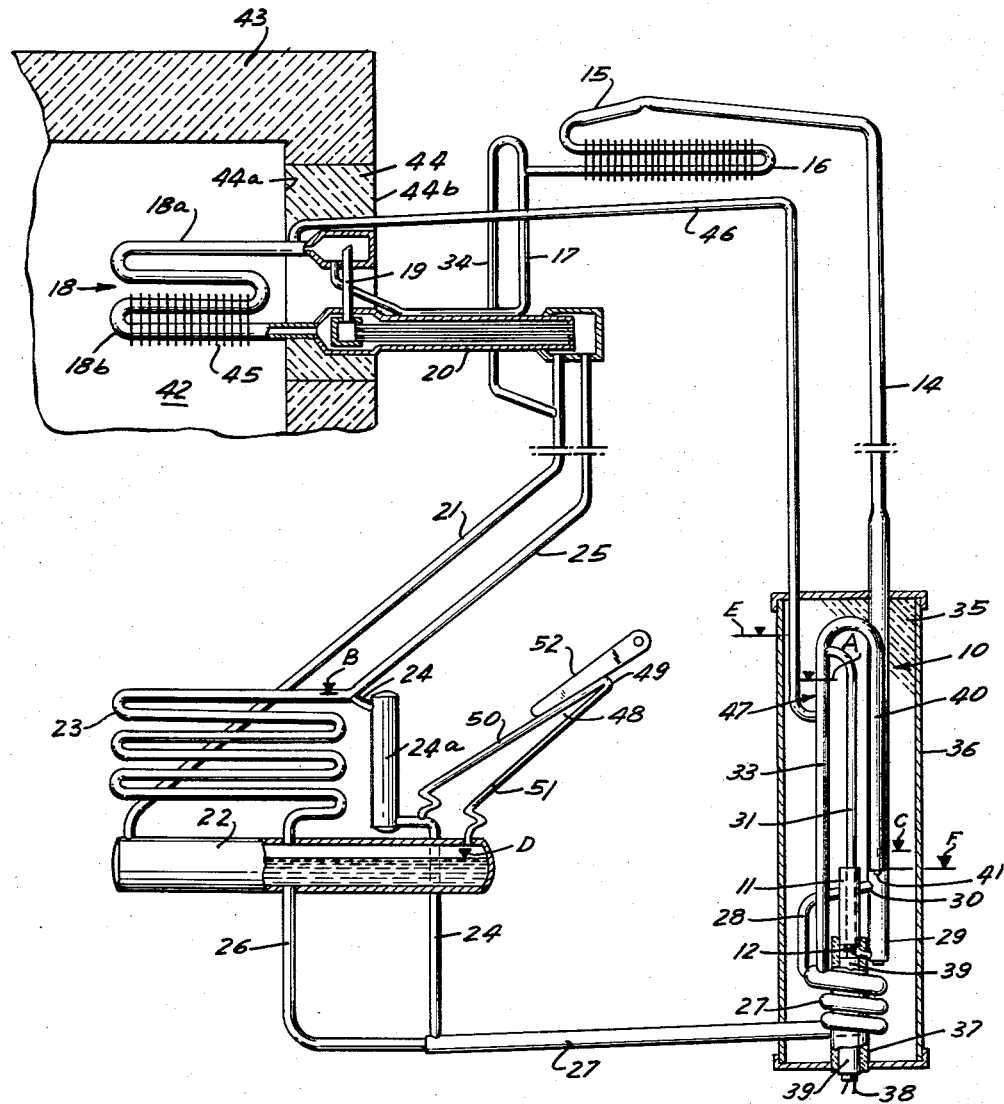
Figure 2:
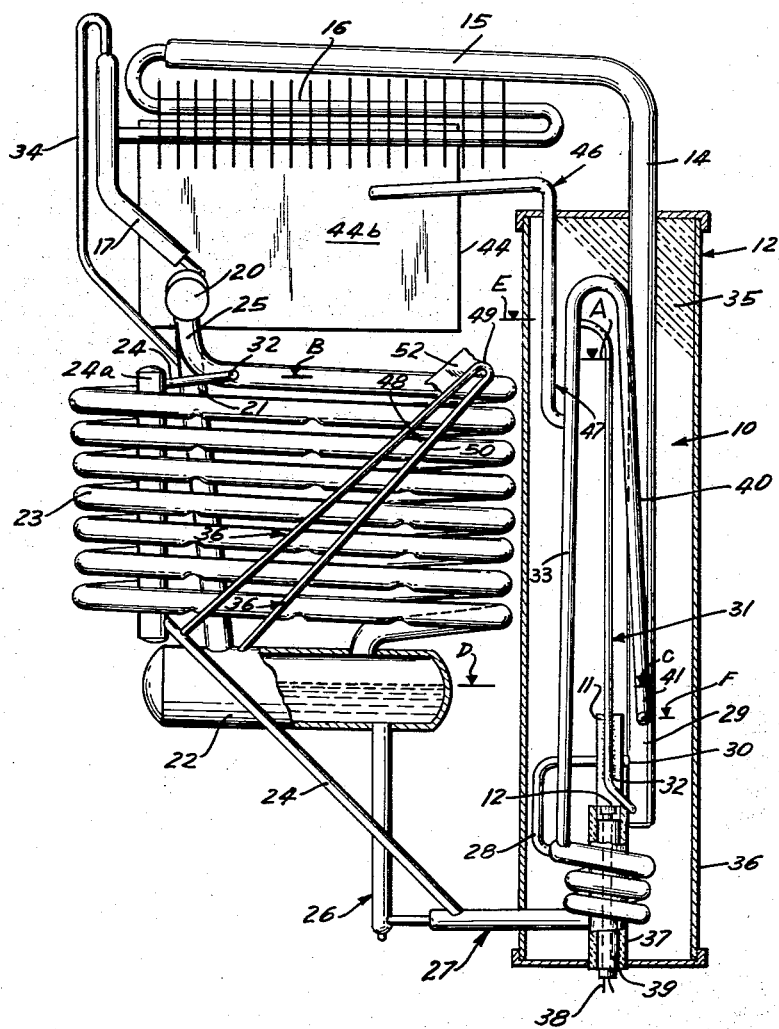

For a better understanding of my invention, reference may be had to the following description taken in connection with the accompanying drawing, in which:

Fig. 1 illustrates more or less diagrammatically an absorption refrigeration system of the inert gas type embodying the invention, and Fig. 2 is a view illustrating one practical form of carrying out the invention shown in Fig. 1.

Referring to Figs. 1 and 2, I have shown my invention embodied in an absorption refrigeration system of a uniform pressure type in which an inert pressure equalizing gas is employed. A refrigeration system of this type comprises a vapor expulsion unit 10 containing a refrigerant, such as ammonia, in solution in a body of absorption liquid, such as water. Heat is supplied to the vapor expulsion unit 10 from a heating tube 11 in a manner to be described presently. The heating tube 11 may be heated by an electrical heating element 12, for example, which is disposed within the tube.

The heat supplied to the vapor expulsion unit and absorption solution contained therein expels refrigerant vapor out of solution, and, in a manner which will be described hereinafter, the refrigerant vapor passes upwardly from the vapor expulsion unit 10 through a vapor supply line or conduit 14 and an air-cooled rectifier 15 into an air-cooled condenser 16 in which it is condensed and liquefied. Liquid refrigerant flows from condenser 16 through a conduit 17 into a cooling unit 18 in which it evaporates and diffuses into an inert pressure equalizing gas, such as hydrogen, which enters through a conduit 19. Due to evaporation of refrigerant fluid into inert gas in cooling unit 18, a refrigerating effect is produced with consequent absorption of heat from the surroundings.

The rich gas mixture of refrigerant vapor and inert gas formed in cooling unit 18 flows from the lower part thereof through one passage of a gas heat exchanger 20, a conduit 21 and an absorber vessel 22 into the lower end of an absorber coil 23. In absorber coil 23 the rich gas mixture flows counter-current to downwardly flowing absorption liquid which enters through a conduit 24. The absorption liquid absorbs refrigerant vapor from inert gas and inert gas weak in refrigerant flows from absorber coil 23 in a path of flow including a conduit 25, another passage of gas heat exchanger 20 and conduit 19 into the upper part of cooling unit 18.

The circulation of gas in the gas circuit just described is due to the difference in specific weight of the columns of gas rich and weak, respectively, in refrigerant vapor. Since the column of gas rich in refrigerant vapor and flowing from cooling unit 18 to the absorber coil 23 is heavier than the gas weak in refrigerant and flowing from the absorber coil 23 to cooling unit 18, a force is produced or developed within the system for causing circulation of inert gas in the manner described.

Absorption solution enriched in refrigerant flows from the absorber vessel 22 through a conduit 26, an inner passage of a liquid heat exchanger 27 and a connection 28 into a vertically extending pipe 29 at a point 30 which is at a level below the liquid surface level of the column of liquid held in the pipe 29. The extreme lower end of pipe 29 is in communication with the lower end of a pump pipe or vapor lift tube 31 in thermal exchange relation with the heating tube 11 at 32, as by welding, for example. Liquid is raised by vapor-liquid lift action through tube or pump pipe 31 into the upper part of a standpipe 33.

The absorption liquid from which refrigerant vapor has been expelled flows from standpipe 33 through the outer passage of liquid heat exchanger 27 and conduit 24 to the level B into the upper part of absorber coil 23. The circulation of absorption solution in the liquid circuit just described is effected by raising of liquid through the pump pipe 31. The outlet end of condenser 16 is connected by a conduit 34 to a part of the gas circuit, as to conduit 21, for example, so that any inert gas which may pass through the condenser 16 can flow to the gas circuit.

The vapor expulsion unit 10, together with a part of the liquid heat exchanger 27, are embedded in a body of insulating material 35 retained in a metal shell or casing 36 having an opening at the bottom thereof. The heating tube 11 is embedded in a part of the body of insulating material 35 which is intermediate the ends thereof and spaced from the top and bottom ends of the shell 36. The electrical heating element 12 is arranged to be positioned within the heating tube 11 through a hollow sleeve member 37 which is formed of suitable insulating material and extends from the bottom of the heating tube 11 to the bottom opening in the shell 36.

The electrical conductors 38 for the electrical heating element 12 extend through an apertured insulating member 39 held in the hollow sleeve member 37. The heating tube 11 snugly receives the heating element 12 which may comprise a cartridge housing an electrical wire or the like having a relatively high resistance that generates heat when connected to a source of electrical energy.

In the operation of the refrigeration system of Fig. 1, vapor generated in the vapor lift pipe 31 flows from the upper end thereof through the upper part of standpipe 33 and a conduit 40 to a region 41 in pipe 29 which serves as an analyzer and is disposed below the liquid surface level C of the liquid column contained therein. Since the conduit 26, inner passage of liquid heat exchanger 27 and the connection 28 provide a path of flow for absorption solution which is always filled with liquid during operation of the system, the liquid level C in pipe 29 is essentially the same as the liquid level D in the absorber vessel 22.

The generated vapor usually is a mixture of refrigerant vapor and absorption liquid vapor; and, when ammonia and water are employed as the refrigerant and absorption liquid, for example, the generated vapor is usually a mixture of refrigerant vapor and water vapor. Due to the difference in boiling points of ammonia and water, the water vapor may be removed from ammonia by cooling the mixture to condense out the water. In Fig. 1 this is accomplished by forcing all of the generated vapor from the conduit 40 through the liquid column in the analyzer 41 by bubble action. The absorption liquid introduced into the analyzer 41 is relatively rich in refrigerant and at a lower temperature than the generated vapor. In bubbling through the enriched solution, the water vapor is cooled sufficiently and condenses and in this way is removed from ammonia vapor. As best seen in Fig. 1, liquid refrigerant conducted from condenser 16 to cooling unit 18 in conduit 17 flows in heat exchange relation with the gas heat exchanger 20.

The cooling unit 18 is disposed in a thermally insulated space 42 of a refrigerator cabinet 43 having a removable wall section 44 to facilitate the insertion of the cooling unit within the cabinet. While in Fig. 1 I have illustrated the gas heat exchanger extending rearwardly from the wall section 44, it will be understood that in practice a compact arrangement of parts is obtained by employing an L-shaped gas heat exchanger (not shown) in which the long arm thereof may be disposed horizontally between the inner and outer faces 44a and 44b of the rear wall section 44 and the short arm thereof projects rearwardly from the outer face 44b.

The cooling unit 18 comprises upper and lower cooling elements 18a and 18b which are shown in the form of coils. The cooling element 18a, which is adapted to be operated at temperatures substantially below freezing, may be arranged in a thermally segregated part of space 42 to provide a frozen food compartment; and cooling element 18b, which is adapted to be operated at a higher temperature than that of cooling element 18a and also desirably below freezing, has a plurality of heat transfer fins 45 fixed thereto to provide a relatively extensive surface for cooling air in the unfrozen food section of the space 42. If desired, the cooling element 18a may be employed to effect cooling of the frozen food compartment and also arranged to effect some cooling of air in the unfrozen food section adapted to flow in thermal exchange relation therewith. During operation of the refrigeration system frost accumulates on the surfaces of the lower cooling element 18b and fins 45 fixed thereto and also on the wall surfaces of the frozen food section of which upper cooling element 18a forms a part.

In order to effect defrosting of cooling unit 18, vapor expelled from solution in generator 10 and at an elevated temperature is conducted to the cooling unit in a path which includes the upper part of standpipe 33 and a conduit 46. By introducing hot expelled vapor into the cooling unit 18 through conduit 46, its temperature rises above the freezing temperature of water. In this way the frost formed in the frozen food section and on the cooling element 18b and fins 45 attached thereto is melted very rapidly by the hot vapor supplied thereto from generator 10 in a path of flow which by-passes the condenser 16.

The lower end of the conduit 46, which may be referred to as a vapor by-pass line around the condenser 16, is connected to the upper part of standpipe 33 at a region which is below the level A at which the liquid surface is maintained in the standpipe by the pump pipe 31. Liquid from the liquid column in the standpipe 33 will rise into the lower end of the by-pass line 46 to a level E which is higher than the liquid level A. The difference in height A—E of the liquid columns formed in standpipe 33 and bottom part of the vapor by-pass line 46 is due to the pressure difference in the system resulting from the gas circuit being at a lower pressure than the pressure above the liquid column in standpipe 33. This pressure difference includes the pressure difference represented by the liquid column C—F in the analyzer 41, and the pressure difference due to resistance offered to flow of fluid from the analyzer 41 through the vapor line 14, rectifier 15, condenser 16 and conduit 34 to a part of the gas circuit.

When the column of liquid in the bottom of the by-pass line 46 rises to the level E, the by-pass line for introducing hot vapor into cooling unit 18 is blocked and generated vapor flows through the analyzer 41 to the condenser 16 from which liquid refrigerant flows by gravity to cooling unit 18. Under these conditions, the liquid held in the U-shape trap 47 formed by the bottom part of conduit 46 and upper part of standpipe 33 forms a liquid seal which prevents flow of hot expelled vapor therethrough, the liquid forming such seal being absorption liquid that is weak in refrigerant and held in that portion of the absorption liquid circuit in which weak absorption liquid is conducted from the generator 10 to the absorber coil 23.

In accordance with my invention, defrosting of cooling unit 18 is instigated by removing absorption liquid weak in refrigerant from liquid trap 47 and effecting such removal of liquid from the trap responsive to transfer of liquid from the path of flow of weak absorption liquid to the path of flow of rich absorption liquid in the absorption liquid circuit. I accomplish this by providing a siphon in the form of an inverted V-shape loop 48 having a closed end 49 and downwardly extending arms 50 and 51 connected at their lower ends to the conduit 24 and absorber vessel 23, respectively. The loop 48 is flexible with respect to the conduit 24 and absorber vessel 23, so that it can be lowered and raised in any suitable manner. As diagrammatically illustrated in Fig. 1, lowering and raising of loop 48 may be effected by an eccentric or crank 52 which is pivotally connected in any suitable manner at a region adjacent the closed end 49 of the loop.

During normal operation of the refrigeration system vapor expelled from solution in vapor-liquid lift pipe 31 flows from the upper end thereof into standpipe 33 and from the latter through conduit 40 to the analyzer 41. After bubbling through the liquid column C—F in the analyzer 41, the vapor flows through the vapor line 14 and rectifier 15 into the condenser 16 in which it is liquefied and condensed. Liquid refrigerant flows from condenser 16 to cooling unit 18 to produce refrigeration in cabinet 43 in the manner previously explained. Under these conditions the upper closed end 49 of loop 48 is at a level above the level B at which weak absorption liquid is introduced into the upper end of absorber coil 23 from the conduit 24, and the trap 47 remains filled with liquid to block the flow of vapor to cooling unit 18 through the by-pass line 46.

If the eccentric or crank 52 is now turned in a counter-clockwise direction and the closed end 49 of loop 48 is lowered below the level B, weak absorption liquid is siphoned from standpipe 33 and trap 47 and is transferred by the loop 48 to the absorber vessel 22 which forms a part of the absorption liquid circuit in which rich absorption liquid is normally held. The parts are so constructed and arranged that the closed end 49 of loop 48 can be lowered by crank 52 to a level which is sufficiently low for such a quantity of liquid to be siphoned from the upper part of standpipe 33 and conduit 46 that all of the liquid will be removed from trap 47 and allow expelled vapor at an elevated temperature to flow directly to cooling unit 18 from generator 10 through the conduit 46. When this occurs the liquid column in analyzer 41 offers sufficient resistance to block the flow of vapor therethrough so that normal flow of vapor through conduit 14 to condenser 16 will be momentarily stopped and all of the vapor generated in vapor expulsion unit 10 will flow to cooling unit 18 through by-pass line 46 to effect rapid defrosting of the cooling unit.

When liquid is being siphoned through the loop 48 from the upper part of standpipe 33 in the manner just explained, the liquid level in the standpipe will be lowered to such an extent that liquid no longer will flow from the upper end of conduit 24 into the top part of absorber coil 23 at the level B, thus stopping circulation of absorption liquid through the absorber coil 23. When this occurs the circulation of inert gas in the gas circuit will stop because refrigerant vapor no longer will be absorbed from inert gas into absorption liquid. When gas circulation stops, cooling unit 18 is rendered inoperable and its temperature also rises for this reason to promote defrosting of cooling unit 18.

The heating tube 11 desirably is heated continuously by the heating element 12 while defrosting is being effected. The defrosting structure shown in Figs. 1 and 2 and just described may be operated as a "manual" control by moving crank 52 in a counter-clockwise direction from the position shown in Fig. 1, and, after an interval of time corresponding to the length of the defrosting period, moving the crank in a clockwise direction back to the position of Fig. 1. It also is possible to operate the defrosting structure semi-automatically, that is, to start defrosting manually and terminate each defrosting period automatically. I accomplish this by providing in the conduit 24 vertically extending section 24a which extends vertically upward from the region the arm 50 of the loop 48 is connected thereto, the section 24a having a cross-sectional area larger than that of the conduit section 24 below the region at which liquid is diverted at 50 into the loop 48 by siphon action.

By providing the conduit section 24a in the weak absorption liquid line between the standpipe 33 and inlet end of absorber coil 23, a defrosting period can be started in the usual manner by turning crank 52 in a counter-clockwise direction to siphon liquid through loop 48 from the trap 47 to absorber vessel 22. After an interval of time which is only sufficiently long for trap 47 to be depleted of liquid and considerably shorter than the length of the defrosting period, the crank 52 may be turned clockwise to the position illustrated in Fig. 1. Since heat desirably is being supplied continuously to heating tube 11 by the heating element 12, liquid will continue to be raised by the pump pipe 31 into the upper part of standpipe 33 which will cause the liquid levels in the latter and in vertical conduit 24 to rise gradually until the liquid surface in the conduit 24 reaches the level B, at which time absorption liquid again will be introduced into the upper end of the absorber coil 23. When this occurs the trap 47 will again be filled with liquid to block flow of vapor in the by-pass line 46 and normal operation of the refrigeration system will be resumed. By providing the vertical conduit section 24a of larger cross-sectional area than the conduit section 24 below the region at which arm 50 of loop 48 is connected thereto, the length of time that it takes for the liquid level in conduit 24 to reach the level B can be increased. In this way the length of the defrosting period can be made longer or shorter depending upon the different factors that must be considered to provide an adequately long defrosting period in a given situation.

The flexible loop 48 may be constructed and connected to other parts of the refrigeration system in any suitable manner to provide a siphon having the desired flexibility. In order to reduce the vertical height through which the closed end 49 of loop 48 must be moved, the loop desirably is inclined to the vertical in the manner shown in Figs. 1 and 2. In Fig. 2 the absorber coil 23 is shown in the form of a looped coil having a vertically extending passageway between the spaced straight arms of the individual turns of the coil. In an absorber coil of this type the loop 48 may be arranged so that it extends upwardly within the passageway formed between the opposing inclined straight sides of the coil.

Although several embodiments of the invention have been shown and described, it will be apparent to those skilled in the art that various modifications and changes may be made without departing from the spirit and scope of the invention, as pointed out in the following claims.

I claim:

1. In the art of refrigeration with an absorption refrigerating system including vaporizing refrigerant in the presence of an inert gas at a place of evaporation to produce a refrigerating effect, circulating the inert gas through and between the place of evaporation and a place of absorption, flowing absorption liquid rich in refrigerant in a path from the place of absorption to a place of vapor expulsion and flowing absorption liquid weak in refrigerant in a path from the place of vapor expulsion to the place of absorption, the place of evaporation being subject to the formation of frost, the improvement which comprises flowing vaporized fluid at an elevated temperature in a path of flow from the place of vapor expulsion to the place of evaporation to melt any frost formed due to said refrigerating effect, flowing absorption liquid weak in refrigerant to a region in said path of flow of vaporized fluid to stop flow of such vaporized fluid to said place of evaporation, removing absorption liquid weak in refrigerant from said region to open said path of flow of vaporized fluid to said place of evaporation, and effecting such removal by transferring absorption liquid weak in refrigerant from the path of flow of weak absorption liquid to the path of flow of rich absorption liquid.

2. The improvement set forth in claim 1 in which circulation of absorption liquid through and between said place of absorption and said place of vapor expulsion is effected by vapor-liquid lift action, and flowing to said region in said path of flow of vaporized fluid absorption liquid raised from one level to a higher level by said vapor-liquid lift action.

3. The improvement set forth in claim 1 in which weak absorption liquid is removed from said region in said path of flow of vaporized fluid by siphoning absorption liquid weak in refrigerant from the path of flow of weak absorption liquid to the path of flow of rich absorption liquid.

4. In a method of refrigeration which includes expelling refrigerant from absorption solution at a place of vapor expulsion and flowing solution weak in refrigerant therefrom in a first path to a place of absorption, liquefying the expelled refrigerant at a place of condensation and flowing the condensate to a place of evaporation, evaporating the refrigerant in the presence of an inert gas at the place of evaporation to produce a refrigerating effect, circulating the inert gas between the place of evaporation and the place of absorption, flowing solution rich in refrigerant in a second path from the place of absorption to the place of vapor expulsion, the place of evaporation being subject to formation of frost due to said refrigerating effect, the steps of flowing expelled refrigerant from the place of vapor expulsion to the place of evaporation in a path which by-passes the place of condensation to melt any frost formed due to said refrigerating effect, accumulating absorption solution weak in refrigerant in a trap in said path of flow for expelled refrigerant to stop flow of such refrigerant to said place of evaporation, and vertically moving a part associated with said first path of flow for weak absorption solution to transfer such solution to said second path of flow for rich absorption solution to effect removal of weak absorption solution from said trap to open said path of flow for expelled refrigerant to said place of evaporation.

5. The method set forth in claim 4 in which said part is moved vertically downward to siphon weak absorption solution from said first path of flow to said second path of flow for rich absorption solution to effect removal of weak absorption liquid from said trap.

6. In absorption refrigeration apparatus having an inert gas circuit including an evaporator and an absorber and a circuit including said absorber and a vapor expulsion unit for circulation of absorption liquid enriched in refrigerant from said absorber to said vapor expulsion unit in a rich liquid line and for circulation of absorption liquid weak in refrigerant from said vapor expulsion unit to said absorber in a weak liquid line, conduit means including a liquid trap for conducting vapor from said vapor expulsion unit to said evaporator, said liquid trap being so constructed and arranged that it is filled with weak absorption liquid during normal operation of the refrigeration system, and structure associated with said absorption liquid circuit for transferring absorption liquid from said weak liquid line to said rich liquid line, said structure being so constructed and arranged that liquid is removed from said trap responsive to transfer of absorption liquid from said weak liquid line to said rich liquid line.

7. Absorption refrigeration apparatus as set forth in claim 6 in which said structure associated with said absorption liquid circuit comprises a siphon.

8. Absorption refrigeration apparatus as set forth in claim 6 in which said structure associated with said absorption liquid circuit comprises a flexible siphon, and means operable exteriorly of said apparatus for controlling said siphon.

9. Absorption refrigeration apparatus as set forth in claim 6 in which said structure associated with said absorption liquid circuit includes piping having a pair of vertically extending arms connected at their upper ends, said arms at their lower ends being connected to the weak and rich liquid lines, respectively.

10. Absorption refrigeration apparatus as set forth in claim 9 in which said piping is so constructed and arranged that said arms are flexible and the upper connected ends thereof are vertically movable.

11. Absorption refrigeration apparatus as set forth in claim 10 in which said flexible arms are biased upwardly to a first position, and means for moving said arms downwardly from said first position to a second position.

12. Absorption refrigeration apparatus as set forth in claim 11 in which said arms are inclined at an acute angle to the vertical.

13. Absorption refrigeration apparatus as set forth in claim 6 in which said absorber includes an absorber vessel and an absorber coil having its lower end connected to said vessel, one end of said weak liquid line being connected to the upper end of said absorber coil and one end of said rich liquid line being connected to said vessel, said structure associated with said absorption liquid circuit including piping having a pair of vertically extending movable arms connected at their upper ends, said arms at their lower ends being connected to the weak liquid line and rich liquid line, respectively, and said arm connected to said weak liquid line being connected thereto at a region which is at a level higher than said vessel.

14. Absorption refrigeration apparatus as set forth in claim 13 in which said arm connected at its lower end to said rich liquid line is so constructed and arranged that liquid is discharged therefrom to said rich liquid line at the absorber end of said absorption liquid circut.

15. Absorption refrigeration apparatus as set forth in claim 13 in which said weak liquid line includes sections which extend vertically above and below the region said arm is connected thereto, the section of said weak liquid line extending above said region having an average cross-sectional area larger than that of the section extending below said region.

References Cited in the file of this patent

UNITED STATES PATENTS

| | | |
|---|---|---|
| 2,181,276 | Kogel et al. | Nov. 28, 1939 |
| 2,285,884 | Ashby | June 9, 1942 |
| 2,468,104 | Phillips | Apr. 26, 1949 |
| 2,749,095 | Anderson et al. | June 5, 1956 |